United States Patent
Israel et al.

(10) Patent No.: US 10,866,363 B2
(45) Date of Patent: Dec. 15, 2020

(54) WIDEBAND SURFACE COUPLING

(71) Applicant: Teramount Ltd., Jerusalem (IL)

(72) Inventors: Abraham Israel, Jerusalem (IL); Hesham Taha, Jerusalem (IL)

(73) Assignee: TERAMOUNT LTD., Jerusalem (IL)

( * ) Notice: Subject to any disclaimer, the term of this patent is extended or adjusted under 35 U.S.C. 154(b) by 0 days.

(21) Appl. No.: 16/386,859

(22) Filed: Apr. 17, 2019

(65) Prior Publication Data

US 2019/0324211 A1  Oct. 24, 2019

Related U.S. Application Data

(60) Provisional application No. 62/659,376, filed on Apr. 18, 2018.

(51) Int. Cl.
G02B 6/12 (2006.01)
G02B 6/30 (2006.01)

(52) U.S. Cl.
CPC .................. *G02B 6/305* (2013.01)

(58) Field of Classification Search
CPC .......... G02B 6/12; G02B 6/4214; G02B 6/42; G02B 6/26
See application file for complete search history.

(56) References Cited

U.S. PATENT DOCUMENTS

| | | | |
|---|---|---|---|
| 4,763,977 A * | 8/1988 | Kawasaki | G02B 6/283 359/900 |
| 9,804,334 B2 | 10/2017 | Israel et al. | |
| 2017/0160481 A1 * | 6/2017 | Ling | G02B 6/305 |

FOREIGN PATENT DOCUMENTS

| CA | 1253377 A | 5/1989 |
|---|---|---|
| KR | 20170081265 A | 7/2017 |

OTHER PUBLICATIONS

International Search Report and Written Opinion of International Searching Authority for PCT/US2019/027871, ISA/RU, Moscow, Russia, dated Aug. 22, 2019.

\* cited by examiner

*Primary Examiner* — Jennifer Doan
(74) *Attorney, Agent, or Firm* — M&B IP Analysts, LLC

(57) ABSTRACT

A wideband photonic bump (WBB), including: a positive taper of a polymer waveguide configured to further expand a light beam from an inverse taper to match a fiber optical mode of an optical fiber; a curved mirror formed on a surface of the WBB configured to reflect a light beam from the optical fiber; and a tilted flat mirror configured to direct the reflected light beam to an external optical fiber, wherein the WBB is coupled on the surface of a photonic integrated circuit (PIC).

14 Claims, 6 Drawing Sheets

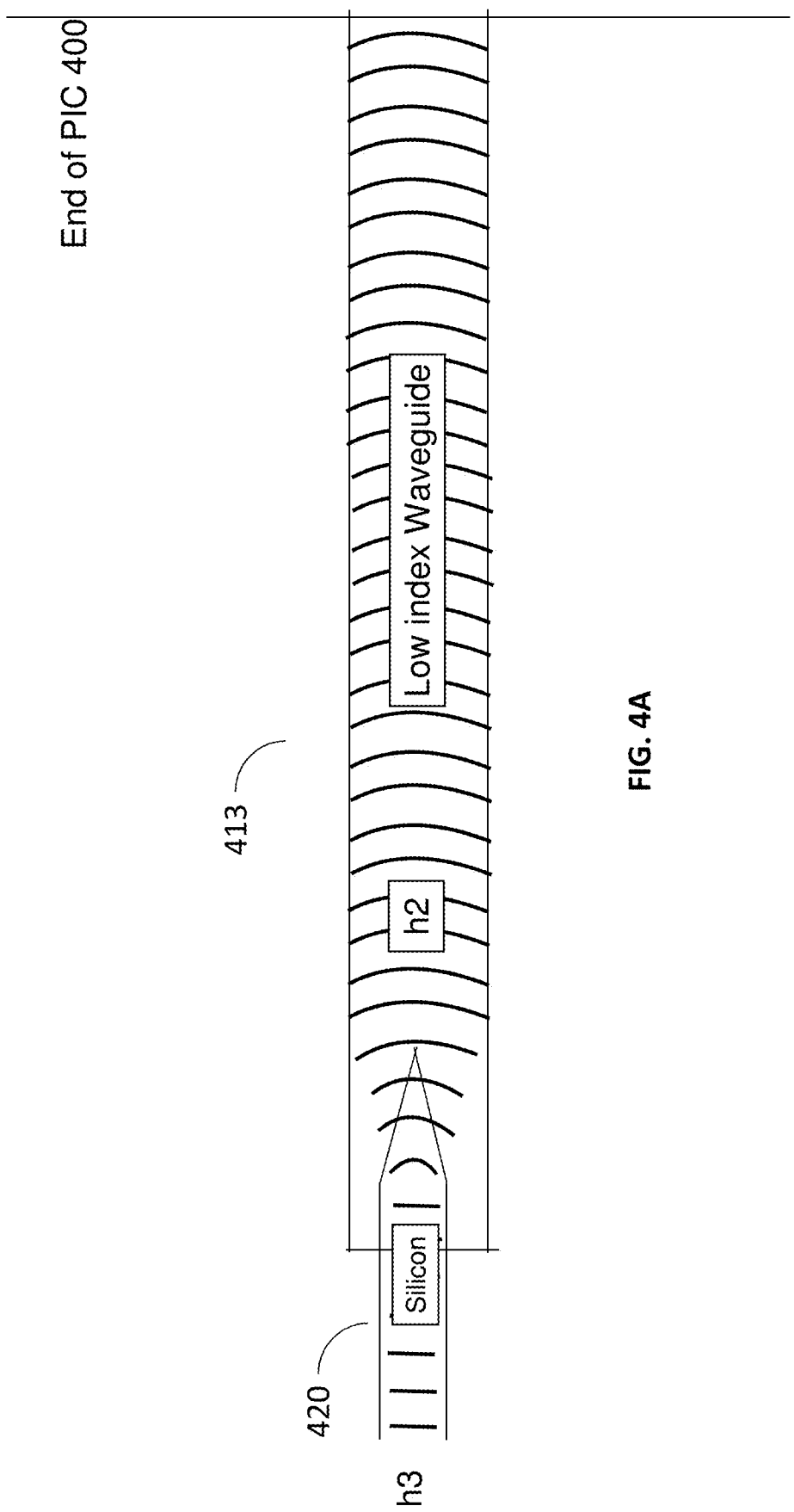

WIDEBAND SURFACE COUPLING

CROSS REFERENCE TO RELATED APPLICATIONS

This application claims the benefit of U.S. Provisional Application No. 62/659,376 filed Apr. 18, 2018, the contents of which are incorporated by reference.

TECHNICAL FIELD

The present disclosure relates generally to optical waveguides, and more particularly to waveguide surface coupling.

BACKGROUND

Communications systems and datacenters are required to handle massive amounts of data at ever increasing speeds and ever decreasing costs. To meet these demands, optical fibers and optical integrated circuits (ICs), such as a photonic integrated circuit (PIC) or an integrated optical circuit (IOC), are used in tandem with high speed electronic ICs. A PIC is a device that integrates multiple photonic functions, similar to an electronic IC or radio frequency (RF) IC. PICs are typically fabricated using silicon, indium phosphide or silicon oxide ($SiO_2$), which allows for the integration of various optically active and passive functions on the same circuit.

The coupling of PICs to optical fibers or to laser modules is not as well advanced as the integration or coupling of electronic ICs. Specifically, the challenges facing optical connections are different and much more complex than connecting electronic ICs to, for example, electrical pads. Some difficulties are inherent signal losses due to wavelength dependency, Polarization dependency, and tight assembly tolerances of optical packaging.

A major challenge in the design and fabrication of PICs is maintaining efficient coupling between compact surface waveguides and external optic devices (e.g., a fiber or laser element). In particular, wideband surface coupling remains a challenge for waveguides of sub-micrometer dimensions made in high index contrast materials, such as semiconductors.

Current wideband optical coupling is performed at the end of the PIC, and therefore does not allow surface coupling. A conventional optical coupling is achieved using a low index of refraction waveguide being "wrapped" around the signal output on a PIC to expand the beam. A top-view and side-view of such a coupling is shown in FIG. 4A and FIG. 4B. As illustrated, the waveguide 410 is extended to the end of the PIC 400. The waveguide 410 expands the wavelength from the output 420 of less than 1 micron to approximately 3 to 5 microns.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a wideband photonic bump (WBB), including: a positive taper of a polymer waveguide configured to further expand a light beam from an inverse taper to match a fiber optical mode of an optical fiber; a curved mirror formed on a surface of the WBB configured to reflect a light beam from the optical fiber; and a tilted flat mirror configured to direct the reflected light beam to an external optical fiber, wherein the WBB is coupled on the surface of a photonic integrated circuit (PIC).

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 4A and 4B are a schematic diagram showing a side view and a top view of conventional WDM coupling.

DETAILED DESCRIPTION

Figure 1:
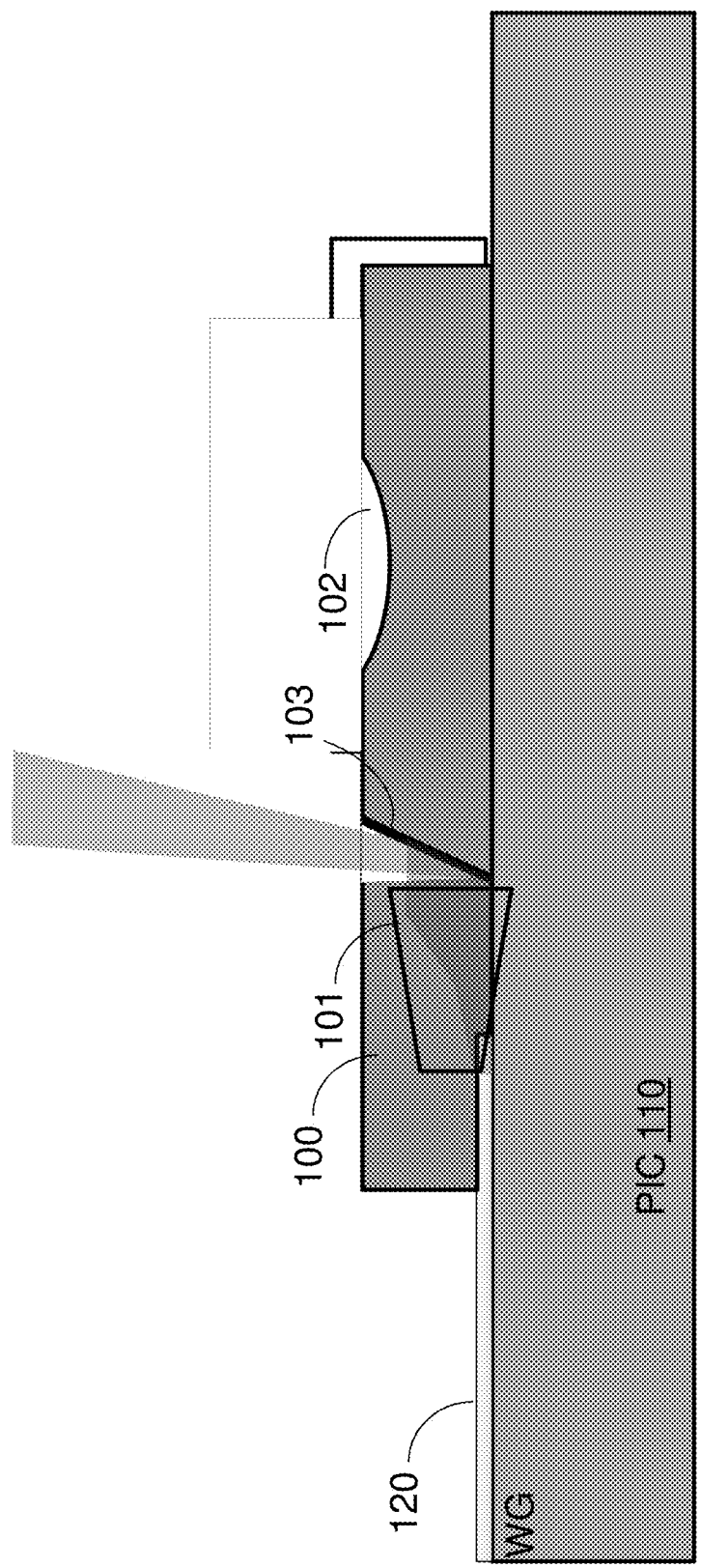
FIG. 1 is a schematic diagram showing a side view illustrating the placement of a Wideband photonic bump (WBB) on a PIC according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide an optical module that allows wideband surface coupling between a photonic integrated circuit (PIC) (e.g., a photonic chip), and other optical elements (e.g., fibers and lasers), while ensuring low signal losses and thermal stability. The optical module is referred hereinafter as the WBB. Furthermore, the disclosed WBB achieves high signal efficiency with a relaxed alignment between the PIC and the optical element (fiber or laser).

To this end, the WBB performs the functions of mode conversion to allow connectivity to a single mode fiber and beam deflection. In an embodiment, the WBB further provides an optical interface to a photonic plug. The WBB disclosed herein can be fabricated by a lithography process, such as grayscale photolithography, nanoimprint lithography, and the like.

FIG. 1 is a schematic diagram showing a side view illustrating the arrangement of the WBB 100 on a photonic integrated circuit (PIC) 110 according to an embodiment. The optical arrangement of the WBB 100 on the surface of the PIC 110 provides surface coupling. Specifically, the WBB 100 is optically connected to an inverse taper 120 of the PIC waveguide (hereinafter the "inverse taper" 120) and deflects a light beam from the inverse taper 120 to eventually reach, for example, a fiber (not shown in FIG. 1) while converting the light beam from a small waveguide mode to a large optical fiber mode.

In an embodiment, the inverse taper 120 is adiabatically narrowed down to allow the light beam to expand from a width of about less than 1 micron to about 3 or 4 microns at an endpoint of the waveguide.

The inverse taper 120 is part of the PIC 110, and thus is formed during the fabrication of the PIC 110. The optical fiber mode, on the other end, is typically 2-3 times larger (e.g., 10 microns) and an optical mode-matching element is required.

As schematically illustrated in FIG. 1, to allow a surface coupling, a light beam extracted from the PIC 110 is expanded, using two tapers, until the expanded light beam is deflected upwards.

According to an embodiment, the WBB 100 includes a positive taper of a polymer waveguide (hereinafter "positive taper 101"), a curved (collimated) mirror 102, and a tilted flat mirror 103. In certain embodiments, the positive taper 101 is structured and positioned post fabrication of the PIC 110. The positive taper 101 is utilized to further expand the light beam from the inverse taper 120 to match a fiber optical mode. From the positive taper 101, the light beam is deflected the flat mirror 103.

The tilted flat mirror 103 is utilized to direct the extended light beam to an external optical fiber (not show in FIG. 1) through an optical connection of a photonic plug. The optical paths of the beams deflected from the flat mirror 103 are discussed below. The light path allows for placement of the optical fiber parallel to the PIC 110.

In an embodiment, the tilted flat mirror 103 is tilted at a predefined angle. The angle is determined based on the optical path between the optical fiber and the curved mirror 102, e.g., an optical as demonstrated in FIG. 3 below. In an embodiment, the tilted flat mirror 103 is formed by using, for example, a nanoimprint lithography process that combines grayscale lithography to prepare the master for nanoimprint.

The curved mirror 102 is formed on the surface of the WBB 100 and is utilized to reflect a light beam from the photonic plug (both not shown in FIG. 1). In an embodiment, the curved mirror 102 can be formed on a substrate layer using a grayscale lithography process, a nanoimprint lithography process, and the like. In an embodiment, both the tilted mirror 103 and the curved mirror 102 are coated with dielectric layers that acts as a mirror (e.g., for specific wavelength, angle) to improve beam reflectivity.

The positive taper 101 performs an expansion of the light beams extracted from the PIC's 110 substrate though the inverse taper 120 to match an optical fiber mode. As noted above, the positive taper 101 can perform the mode matching (e.g., from 1 micron to 10 microns). According to an embodiment, the shape and material type of the positive taper 101 are selected to allow for such optical mode matching. In a further embodiment, the taper 101 is made of material having an index smaller than the refraction index of the inverse taper 120. In an embodiment, the taper 101 is shaped as shown in FIGS. 2A and 2B.

Figure 2A:
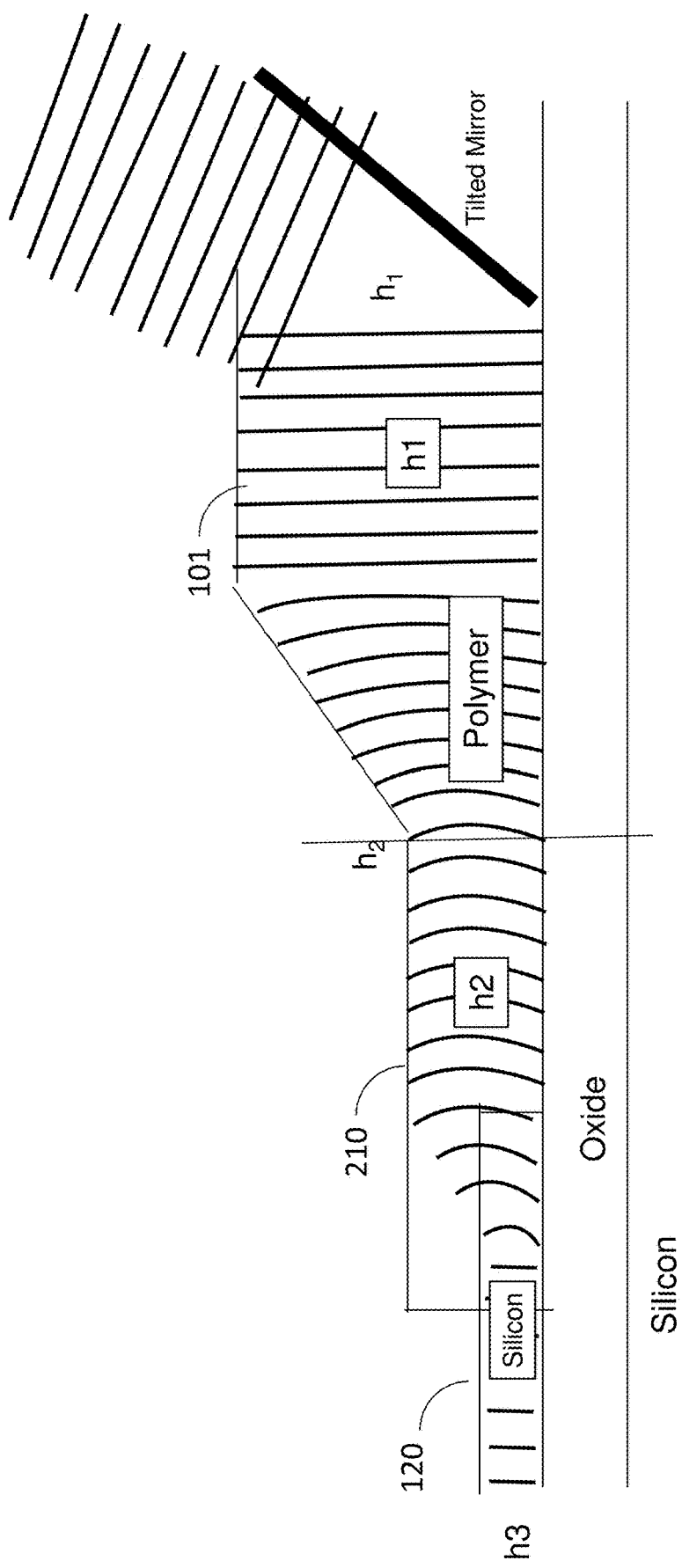
FIGS. 2A and 2B are schematic diagrams showing a side view and top view arrangement of the waveguide according to an embodiment.

FIG. 2A is a schematic diagram showing a side view of the arrangement of the inverse taper 120 and positive taper 101 according to an embodiment. The inverse taper 120 is fabricated on the PIC and is utilized to extract the light beams (optical signals) from the PIC's 110 substrate to a waveguide channel 210. The channel 210 is not tapered and is also made of a polymer and utilized to expand the extracted light beam, e.g., from less than 1 micron to 3-5 microns.

The positive taper 101 is designed to expand the light beam to an optical fiber mode, i.e., to adiabatically transform the extracted light beam to meet an optical mode of a fiber. In an example implementation, the height ($h_1$) at the end of the positive taper 101 is about 10-13 microns and the height ($h_2$) at the beginning of the waveguide channel is about 1-3 microns.

Figure 2B:
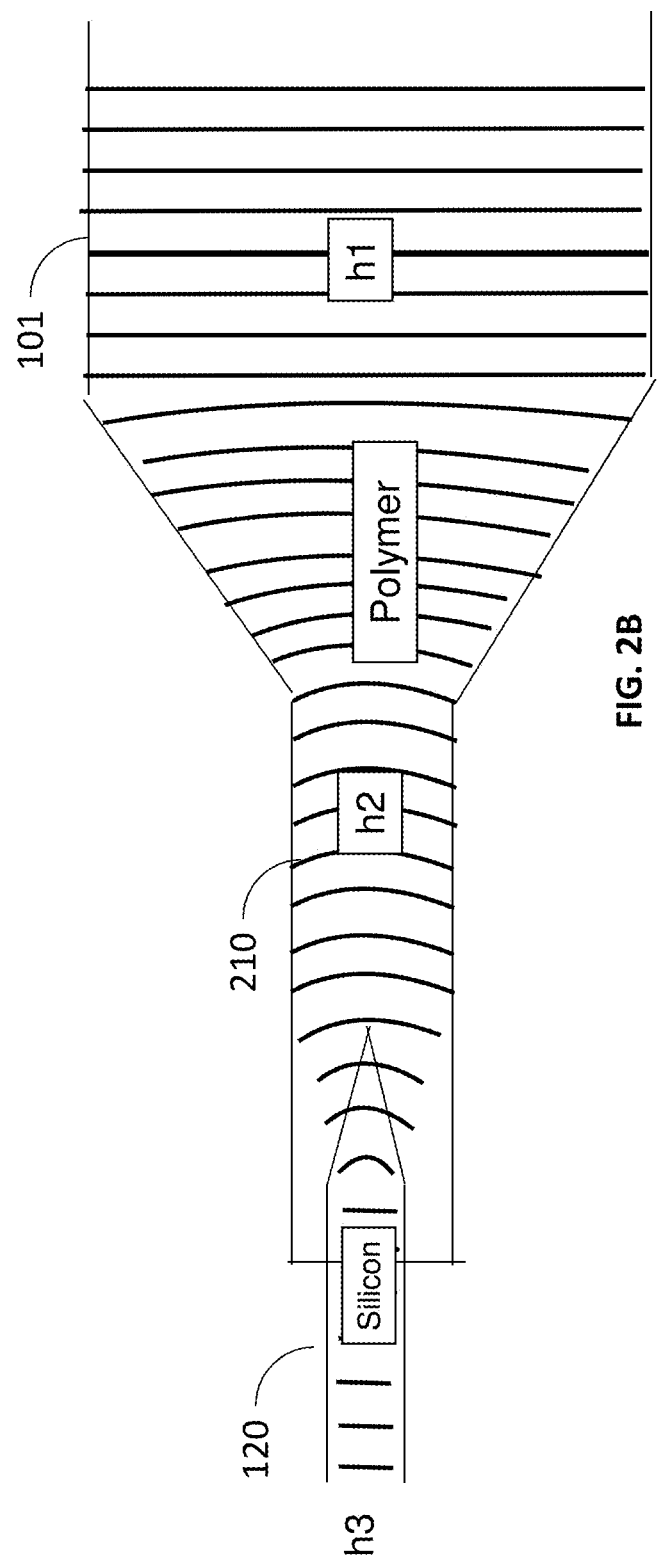

A top view of the arrangement of the inverse taper 120 and positive taper 101 is shown in FIG. 2B.

It should be noted that the WBB 100 allows for surface optical coupling of a PIC and an optical fiber. As the coupling is not performed at the edge of the die of the PIC, the disclosed WBB 100 allows for wafer level testing.

Figure 3:
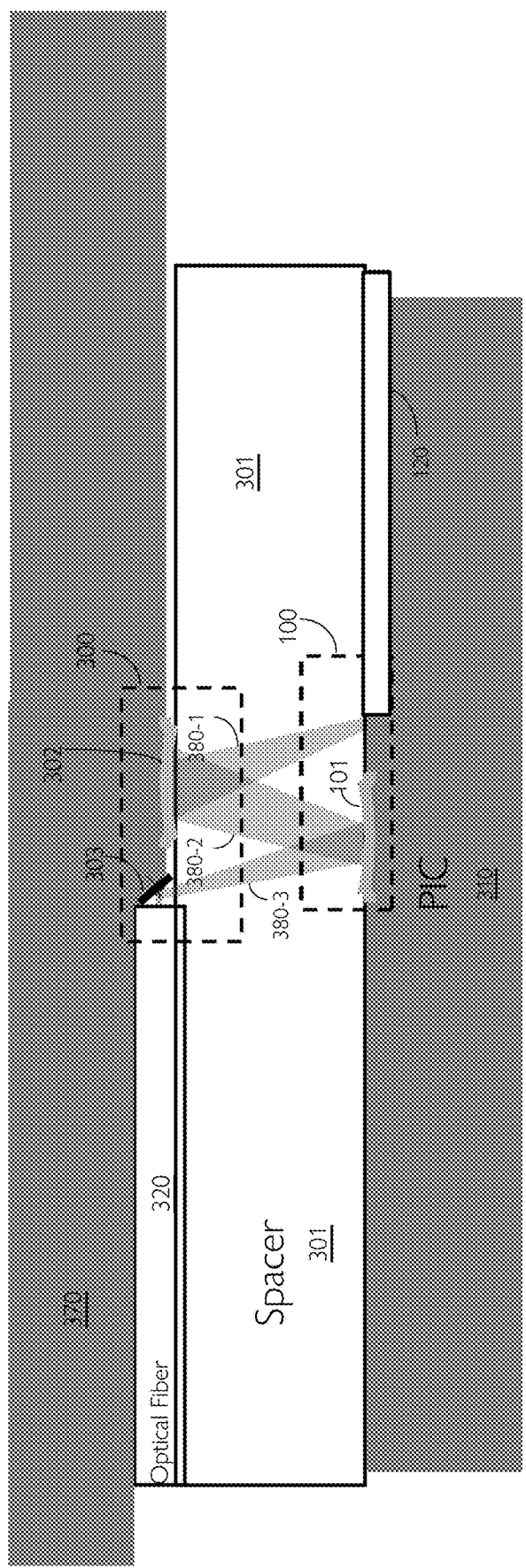
FIG. 3 is a schematic diagram showing a side view of a connection of a WBB to an optical fiber according to an embodiment.
Figure 4B:
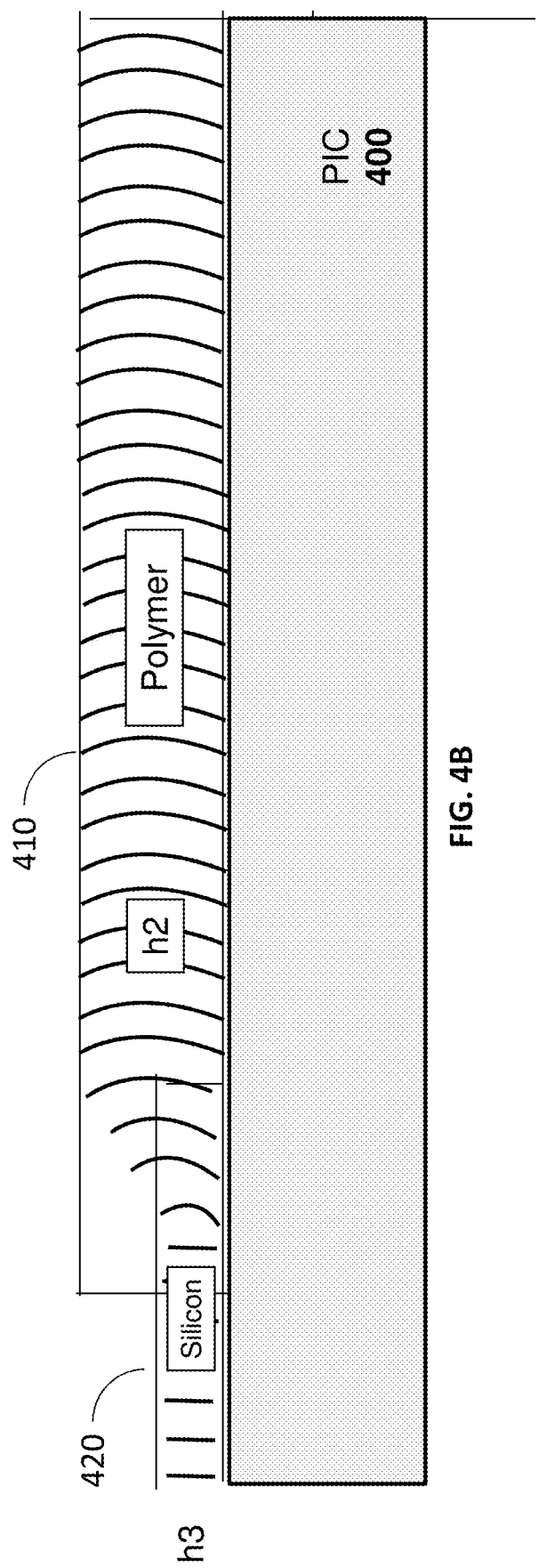

FIG. 3 is a schematic diagram showing a side view of a connection of a WBB 100 to an optical fiber 320 according to an embodiment. The assembly shown in FIG. 3 includes a connection of the WBB 100 to a photonic plug 300.

The photonic plug 300 provides an optical connection between a PIC 310 and an optical fiber 320. In an embodiment, the photonic plug 300 includes a spacer 301 connected between the PIC 310 and the optical fiber 320, a curved mirror 302, and a tilted flat mirror 303. The photonic plug 300 may also include a fiber trench (not shown in FIG. 3).

The optical fiber 320 and the photonic plug 300 are stacked under a substrate layer 370. In an embodiment, the curved mirror 302 and the tilted flat mirror 303 are fabricated in the substrate 370. The substrate 370 may be comprised of the same or a different type of material as the substrate of the PIC 310. In an exemplary embodiment, the substrate layer 370 may be made of silicon dioxide ($SiO_2$), plastic, and the like. In another embodiment, the curved mirror 302 and a tilted flat mirror 303 are fabricated and incorporated in the spacer 301 and not in the substrate 370.

According to one embodiment, the material of the spacer 301 may be any transparent and non-conductive material, such as glass, polydimethylsiloxane, air, or any other index-matching materials. The structure of the photonic plug 300 is disclosed in greater detail in U.S. Pat. No. 9,804,334 assigned to the common assignee and incorporated herein by reference.

According to the disclosed embodiments, the WBB 100 is disposed on the PIC 310. When the spacer 301 is made out of a solid material, a cavity is formed in the spacer 301 to allow for placement of the photonic plug 300 therein.

In the arrangement shown in FIG. 3, a light beam 380-1 is deflected from the WBB 100. The source of the light beam 380-1 is the positive taper (101, FIG. 1). The curved mirror 302 reflects the light beam 380-1 into parallel light beams 380-2. The parallel light beams 380-2 reach the curved mirror (101, FIG. 1) of the WBB 100, which reflects a light beam 380-3 back to a tilted flat mirror 303. The flat mirror 303 directs the light beam 380-3 to the optical fiber 320. It should be noted that all light beams 380 travel through the spacer 301. It should be noted that the light can just as well travel in the opposite direction.

As the tilted flat mirror 303 is utilized to direct a light beam to an optical fiber 320 from the bump 100, this allows for placement of the optical fiber 320 parallel to the PIC 310.

It should be appreciated that the disclosed arrangement of the photonic plug 300 and WDM photonic bump 100 achieves high signal efficiency with a relaxed alignment between the PIC 310 and the optical fiber 320 due to the specific locations and shape of the curved mirrors in the bump and photonic plug placed against each other. The locations of such curved mirrors may be determined at least with respect to the source/drain of the light beam. In an embodiment, the curved mirrors are shaped in such a way that all light beams are reflected and collimated at a certain angle at a center of the curved mirror 302 and focused to a drain after the curved mirror in the WDM photonic bump 100.

It should be further noted that the photonic plug 300 and WBB 100 discussed with reference to FIG. 3 allows for a connection between a single fiber and the PIC 310. However, in a typical arrangement, a plurality of photonic plugs and bumps can be utilized to allow surface coupling of a plurality of optical fibers to the PIC 300.

The various optical couplers have been discussed herein with a reference to a specific embodiment with curved mirrors utilized for propagating light beams. However, the disclosed embodiments can be realized using other reflective or focusing elements, such as optical lenses, zone plates (e.g., Fresnel zone plates), and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A wideband photonic bump (WBB), comprising:
   a positive taper of a polymer waveguide configured to further expand a light beam from an inverse taper to match a fiber optical mode of an optical fiber;
   a curved mirror formed on a surface of the WBB configured to reflect a light beam from the optical fiber; and
   a tilted flat mirror configured to direct the reflected light beam to an external optical fiber, wherein the WBB is coupled on the surface of a photonic integrated circuit (PIC).

2. The WBB of claim 1, wherein the inverse taper is adiabatically narrowed down from a first width to a second width at an endpoint of the polymer waveguide.

3. The WBB of claim 1, wherein the first width is less than 1 micron and the second width is approximately 3 microns.

4. The WBB of claim 1, wherein the inverse taper is fabricated on the PIC.

5. The WBB of claim 1, wherein the positive taper is changed from a first height to a second height, wherein the first high is higher than the second high.

6. The WBB of claim 1, wherein first height is about 10 microns and the second the height is about 2 microns.

7. The WBB of claim 1, wherein the optical fiber is connected to a photonic plug.

8. The WBB of claim 1, wherein the curved mirror and the tilted flat mirror are fabricated on a substrate layer.

9. The WBB of claim 8, wherein the optical fiber is stacked under the substrate layer.

10. The WBB of claim 8, wherein the curved mirror and the tilted flat mirror are fabricated in a spacer.

11. The WBB of claim 10, wherein the spacer is made of a transparent and non-conductive material.

12. The WBB of claim 1, wherein the tilted flat mirror is tilted at a predefined angle, wherein the predefined angle is determined based on the optical path between the optical fiber and the curved mirror.

13. The WBB of claim 1, wherein each of the tilted flat mirror and the curved mirror is formed using at least a nanoimprint lithography process.

14. The WBB of claim 13, wherein the tilted flat mirror and the curved mirror are formed using at least a nanoimprint lithography process.

* * * * *

UNITED STATES PATENT AND TRADEMARK OFFICE
CERTIFICATE OF CORRECTION

| | |
|---|---|
| PATENT NO. | : 10,866,363 B2 |
| APPLICATION NO. | : 16/386859 |
| DATED | : December 15, 2020 |
| INVENTOR(S) | : Abraham Israel and Hesham Taha |

It is certified that error appears in the above-identified patent and that said Letters Patent is hereby corrected as shown below:

On the Title Page

Related U.S. Application Data:
Please insert (63):
-- Continuation-in-part of U.S. Application No. 15/797,792, filed on October 30, 2017, now Pat. No. 10,481,334, which is a continuation of U.S. Application No. 14/878,591, filed on October 8, 2015, now Pat. No. 9,804,334. --

In the Specification

Related Applications, Column 1, Lines 6-8:
Please delete:
"This application claims the benefit of U.S. Provisional Application No. 62/659,376 filed Apr. 18, 2018, the contents of which are incorporated by reference."

Please insert:
-- The present application claims the benefit of U.S. Provisional Application No. 62/659,376, filed April 18, 2018, and is a continuation-in-part of U.S. Application No. 15/797,792, filed on October 30, 2017, now Pat. No. 10,481,334, which is a continuation of U.S. Application No. 14/878,591, filed on October 8, 2015, now Pat. No. 9,804,334, the contents of which are hereby incorporated by reference in their entireties. --

Signed and Sealed this
Sixth Day of September, 2022

Katherine Kelly Vidal
*Director of the United States Patent and Trademark Office*